Dec. 7, 1965 P. R. LOW ETAL 3,222,527
PHOTOSENSITIVE RING CIRCUIT
Filed July 24, 1961
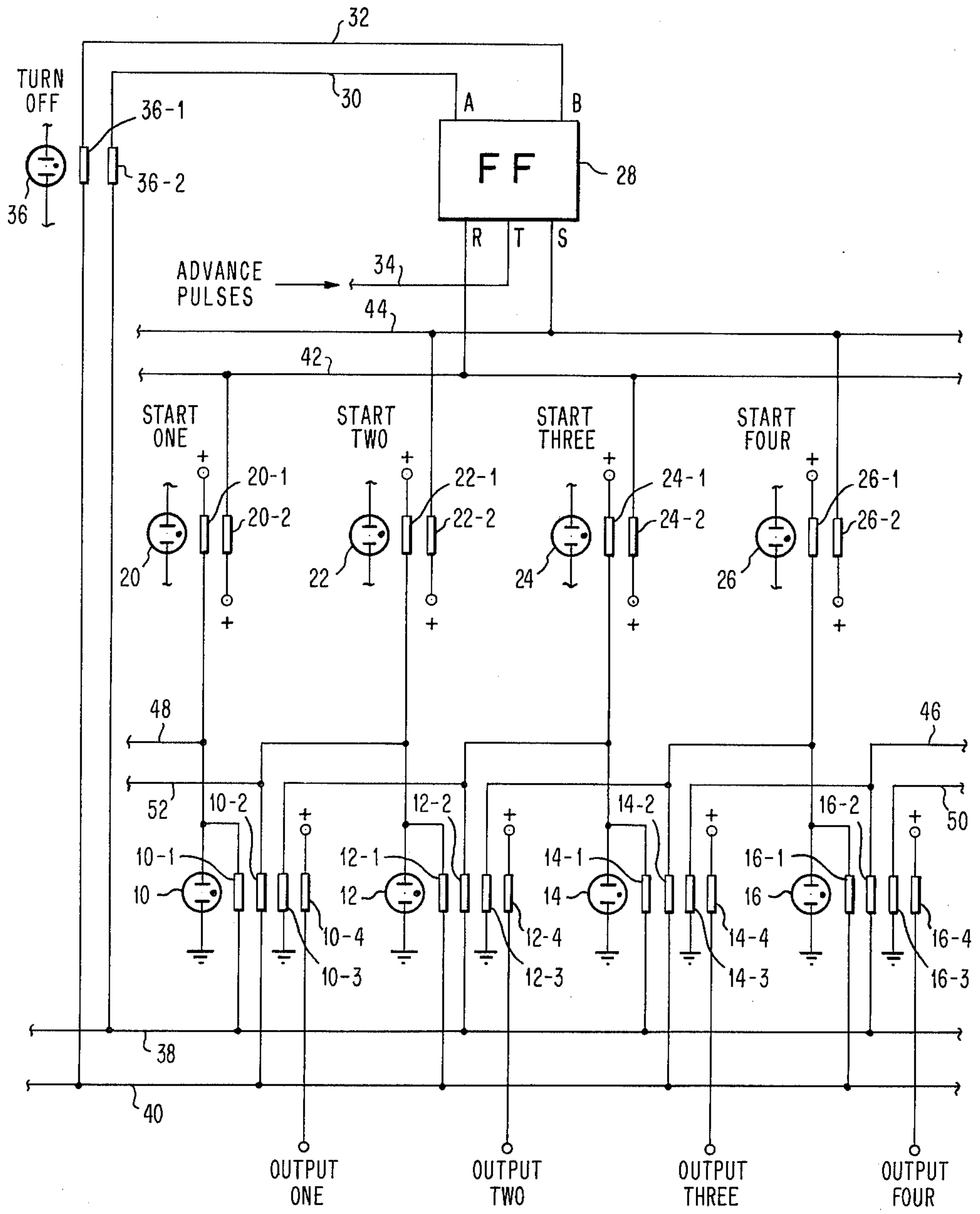
INVENTORS
PAUL R. LOW
REX RICE
BY Curtis Ailes Jr.
ATTORNEY United States Patent Office 3,222,527

Patented Dec. 7, 1965

3,222,527

PHOTOSENSITIVE RING CIRCUIT

Paul R. Low, Palo Alto, Calif., and Rex Rice, Poughkeepsie, N.Y., assignors to International Business Machines Corporation, New York, N.Y., a corporation of New York Filed July 24, 1961, Ser. No. 126,239
7 Claims. (Cl. 250—209)

This invention relates to a ring circuit apparatus. This invention further relates to ring circuit apparatus which is particularly well adapted for embodiment in simple four terminal switching devices such as combinations of lamps and photoconductors.

Step switching devices and ring circuits which are capable of advancing one step or position each time a pulse is received have long been used in various automatic switching systems such as telephone systems and computing and data processing systems. Such devices or circuits are generally useful for the control of the operations of other devices and circuits within the system.

Accordingly, it is an object of this invention to provide this essential function by means of a circuit which is very simple and inexpensive.

Another object of this invention is to provide a ring circuit employing inexpensive components which is characterized by very positive and reliable operation.

Another object of the present invention is to provide an improved ring circuit of the above description in which specific apparatus is provided for the prevention of an erroneous double advance of the ring when only a single advance is called for.

Certain prior ring circuits, and particularly those employing inexpensive components, have incorporated capacitors for the purpose of enhancing the switching operation of the ring. While capacitors are very useful components in many circuits, they are subject to failure and they are expensive.

Accordingly, it is an object of this invention to provide a ring circuit which is simplified by the elimination of any need for capacitors.

Many ring circuits are designed to be started for every series of operations at the same ring position, but it is advantageous for many systems employing ring circuits to have the capability of starting the ring at other positions also.

Accordingly, it is another object of the present invention to provide a ring circuit which may be started at any desired position of the ring.

Another object of the present invention is to provide a ring circuit which may be embodied in simple four terminal devices such as lamp and photoconductor combinations in which it is not necessary for any of the photoconductors to be arranged to receive light from more than one light source.

Another object of the present invention is to provide a ring circuit of the above description which may be embodied in lamp photoconductor components and in which each ring position has at least one lamp device and in which it is not necessary to provide a photoconductor in each ring position which shunts out the preceding ring position in order to insure positive ring operation.

In carrying out the above objects of this invention in one preferred embodiment thereof, a ring circuit is provided which includes a storage device for each ring position and a starting circuit for at least one of the ring positions connected to energize the associated storage device in response to an initial input. Advancement of the ring is controlled by a commutator device connected to energize at least two drive lines to provide a repeating sequence of drive signals to successive ring position storage devices in the form of one pulse at each time an advance of the ring is required. The drive lines are connected to the ring position storage devices by means of switch elements associated with each of the storage devices, the switch elements being arranged to complete the connections upon operation of the associated ring position storage device.

For a more complete understanding of the invention and for an appreciation of other objects and advantages thereof, attention is directed to the following specification and the accompanying drawing which is briefly described as follows:

The single figure of the drawing forms a schematic circuit diagram of a preferred lamp photoconductor embodiment of the ring circuit of the present invention.

The circuit as disclosed in this drawing includes a ring position storage device for each ring position in the form of lamps 10, 12, 14 and 16, only one of which is latched on at each step of operation of the ring. A starting device is provided for starting the ring at each ring position as indicated at 20, 22, 24, and 26. A commutator device in the form of flip flop 28 is provided which supplies advance signals in sequence on drive lines 30 and 32 in response to advance pulses received at flip flop input line 34. A turn off and reset control for the system can be provided as shown by means of a turn off lamp 36 which is maintained in an illuminated condition when the system is on and which is extinguished in order to turn the ring circuit system off.

The control by the lamp 36 is established by means of photoconductors 36–1 and 36–2 which are associated with the lamp 36 and illuminated thereby. The photoconductors 36–1 and 36–2 are in a low resistance or conductive state when illuminated and they thus form an extension respectively of the drive line 32 and 30 to drive line buses indicated at the bottom of the drawing as 38 and 40.

Throughout the drawing, the small rectangular symbols such as are used for photoconductors 36–1 and 36–2 signify devices which have photo responsive properties and which are commonly referred to as photoconductors. Since they are devices which have a lowered impedance when they are illuminated, they are more accurately described as photo responsive impedance devices, but the popular "photo conductor" term is used in this specification. The preferred photoconductor devices will be described more fully below. Throughout the drawing the convention is followed that each photoconductor device is to be illuminated only by the first lamp positioned to the left of that photoconductor in the drawing. Thus, both photoconductors 36–1 and 36–2 are illuminated only by lamp 36.

The flip flop 28 may be a bistable device of conventional construction and therefore, it is not shown in detail. The flip flop 28 is normally operable to provide a continuous output either at A to the drive line 30, or alternately at B to the drive line 32. If the set "signal" is applied to the flip flop 28 at the input line marked S, then the flip flop shifts to provide a B output or it will remain in the state in which it provides a B output to drive line 32 if it is already in that state. However, if a reset signal is applied to flip flop 28 at the input line labeled R, then the flip flop is reset so as to provide an output at A at driveline 30. Whenever an advance pulse is received at line 34, and applied at flip flop input T, the flip flop changes from whatever state it was in before the advance pulse, to the other state. Device 28 is often referred to as a "commutator" device. While the entire ring might be referred to as a commutator, the "commutator" component of this system is distinguished in that it provides fewer unique outputs than the entire ring.

Each of the starting lamp devices 20 through 26 have associated therewith two photoconductors as indicated at 20–1 and 20–2 through 26–1 and 26–2. Each of these photoconductors is connected at one end to a conventional source of power as indicated by a terminal symbol and a "+" sign. Similarly, each of the ring position storage device lamps 10 through 16 has associated therewith switch element photoconductors 10–1 10–2, 10–3, and 10–4 through 16–1, 16–2, 16–3 and 16–4.

The starting device lamp photoconductors 20–2 and 24–2 are each connected to energize a reset bus 42 which energizes the reset input of the flip flop 28. The corresponding photoconductors 22–2 and 26–2 connect the supply voltage to the set bus 44 which in turn, applies the voltage to the set input of the flip flop 28.

The photoconductors 10–1, 12–1, 14–1 and 16–1 are operable for the purpose of latching on the associated storage device lamps. The photoconductors 10–2, 12–2, 14–2, and 16–2 are referred to below as "pick-up" switch elements as they are conditioned by their associated lamps for the purpose of picking up the following ring stage lamp and causing it to be illuminated. In this specification, the term "pick-up" will be used in this connection to refer to the energization of these ring position storage device lamps. The photoconductors 10–3, 12–3, 14–3, and 16–3 are each provided for the purpose of completing a shunt circuit across the pick-up circuit of the following storage device for the purpose of preventing false operation by a pick up of the second following ring position storage device at the time of a ring advance operation.

The photoconductors 10–4, 12–4, 14–4, and 16–4 are simply provided as usable output switch elements. It will be appreciated that additional usable output switch elements may be provided, if desired.

A detailed description of the operation of the system is now presented. The turnoff lamp 36 will be illuminated from a suitable source of voltage and it will remain illuminated as long as the ring is to be maintained in operation. Suppose it is desired to start operation of the ring at stage two. Then a start signal will be applied to start device lamp 22 and photoconductor 22–1 will then supply a voltage to cause illumination of ring position storage device lamp 12. At the same time photoconductor 22–2 will supply a voltage to set bus 44 which will set flip flop 28 to provide an output at B on drive line 32. As previously described, drive line 32 is extended as drive line bus 40 and a voltage will thus be provided from drive line bus 40 through latch photoconductor 12–1 to provide a continuing energization for the ring position storage device lamp 12. The start pulse signal applied to starting device lamp 22 now terminates.

A similar start operation may be followed to start at the third stage, for instance, instead of the second stage, by illuminating the starting device lamp 24. The only difference is that photoconductor 24–2 energizes the reset bus 42 to cause the flip flop to reset and supply an output on the A drive line 30. The latching power is thus provided on the drive line bus 38 which latches the third stage storage device lamp 14 on through latching photoconductor 14–1. It will be appreciated that the starting circuitry for each of the even stages, such as stage four is the same as described for stage two, and the circuitry for each of the odd-number stages, such as stage one, is the same as described for stage three.

Assume now that the ring has been started at stage two and that stage two lamp 12 is latched on. When the ring is to be advanced, an advance pulse supplied on line 34 changes the flip flop from the set to the reset condition and the flip flop output is shifted to the A drive line 30 to apply a voltage to drive line bus 38. This applies energy through pick up photoconductor 12–2 to the third stage lamp 14 to illuminate that lamp. The energy on drive line 38 is thus also supplied through photoconductor 14–1 to latch lamp 14 on. Pick up photoconductor 14–2 will achieve a low impedance condition also as lamp 14 is illuminated. This creates a problem that power from drive line 40, which overlaps the application of power to drive line bus 38, may be applied to the fourth stage lamp 16 through photoconductor 14–2 for a period long enough to cause the fourth stage to pick up. This could in turn cause a shift propagation to a fifth stage (not shown) because the drive line bus 38 is coming up in voltage. In order to prevent any chance of such a false or undesired mode of operation, photoconductor 12–3 is provided for the purpose of shunting to ground the voltage which might otherwise be applied through pick up photoconductor 14–2 to the second succeeding storage device lamp 16. When the shift to stage three is completed and lamp 12 is extinguished photoconductor 12–3 returns to a high impedance and the shunt is thus removed.

Having thus shifted safely and positively from stage two to stage three, when the next advance pulse is received, the flip flop again shifts to the "set" position to provide a "B" output on line 32 and to shift from the third stage to the fourth stage in a manner similar to that described for the shift from stage two to stage three.

While only four stages of this ring are illustrated, it is quite apparent that the ring circuit may be extended to provide as many stages as are required, the circuitry for each of the odd numbered stages being as shown for odd stages one and three, and the circuitry for the even numbered stages being the same as for stages two and four. It is apparent also that the ring may be caused to recirculate, if desired, as long as the last stage is an even stage. This is done by connecting the pick up output line from the last stage to pick up the first stage lamp 10. Thus, for instance, the ring with only four stages as shown may be connected for recirculation by connecting the pick up output from photoconductor 16–2, as indicated at 46, to the corresponding pick up input line of stage one as indicated at 48. The suppression circuit from suppression photoconductor 16–3, as indicated at 50, should also be completed to the corresponding suppression input circuit at stage one as indicated at 52.

As previously mentioned above, although the photo responsive devices as illustrated in the embodiment of this invention are referred to as "photoconductors" it should be emphasized that devices of this description as employed in the system of the present invention are really more accurately described as impedances which achieve a substantially reduced impedance value when they are illuminated. Thus it is contemplated that the impedance of one of these devices may be at least in the order of 200 megohms when not illuminated. But, when it is subjected to illumination its resistance may drop to a typical value in the order of 50,000 ohms and very seldom will the illuminated impedance go below a value of 10,000 ohms. Thus, it is to be seen that a device having a minimum resistance of thousands of ohms, although commonly referred to as a photoconductor, should be more accurately described as an impedance having photoresponsive properties. However, the term "photoconductor" and the like is used in this specification, keeping these qualifications in mind. In the description of the circuit, for convenience, circuit paths are often described as "completed" by the illumination of a particular photoconductor. It will be understood that this is not strictly correct because such a statement really means that a circuit path of lowered impedance is created by illumination of a photoconductor in a circuit which already exists.

Photoconductive devices having impedance characteristics as described above are commercially available. For instance, one such device may be purchased from the Clairex Corporation, of 50 West 26th Street, in New York City, under model number CL3A.

The typical impedance of the photoconductor as indicated above, at 50,000 ohms when illuminated, is applicable when the illumination is from a neon glow lamp positioned within reasonable proximity to the photoconductor. Small, inexpensive neon glow lamps which are suitable for this purpose are commonly available. A typical device of this kind is available for instance from the General Electric Company under Model No. NE-2. Such a device may require about 70 volts to initiate glow conduction when new, but after appreciable aging has occurred, the firing voltage may advance to the order of 115 volts. After the lamp has become illuminated a negative resistance effect is to be observed such that the voltage across the glow lamp may drop to about 55 volts. As the lamp ages, this voltage also rises to a maximum value in the order of 100 volts. The current required for such a neon lamp may vary from one quarter of a milliampere to one milliampere.

It will be appreciated that various other voltage responsive light source devices may be employed and that other photoresponsive devices may be used to detect the illumination from such devices. For instance, the voltage responsive light sources may be electroluminescent devices, or incandescent filament devices, or devices employing gaseous discharges to derive illumination from fluorescent coatings. In each instance, photoconductive devices are selected which are particularly responsive to the spectrum of light emitted by the light source employed. Fortunately, the neon lamps mentioned above and the photoconductive devices mentioned above work well together. Accordingly, the neons are preferred and the light sources in the present specification are all indicated as being neon light sources, but it will be understood that other sources may be employed if desired.

One important advantage of the neon glow lamp as an electrical voltage responsive light source in the present system is the fact that it remains substantially completely dark until its firing voltage threshold is achieved, at which time it suddenly provides substantially full output illumination with a reduced voltage requirement. This characteristic is very desirable because it prevents false operation as long as the voltage is below the threshold value. It also provides for positive operation whenever the voltage goes above the threshold.

With neon glow lamps, it is generally necessary that some series impedance be employed, as well as some shunt impedance. The value of each of the shunt impedances is preferably about one megohm. This one megohm shunt across each neon serves to set a maximum impedance for the neon with respect to the remainder of the circuit. It will be appreciated that the circuits providing energization for lamps 20 through 26 and 36 may be of a complex nature and that the series impedances may therefore be remote from their input connections and in series with other circuit components which do not form part of this invention and are not shown. Although impedance values for the various circuit components are not specified, it will be understood that whenever operation is required to provide output illumination, the series impedances for the various neons will be so chosen as to result in a neon current in the order of one milliampere.

In order to simplify the drawings and make them clearer and more easily understood the lamp shunt and series impedances are omitted from the drawings, but it will be understood that such impedances are to be employed in the practical embodiments of the invention. Also, to further simplify the drawings, the power supply connections are not wired in, either at the common ground connection or at the high voltage connections. The common ground connections are indicated conventionally by the ground symbol, and the high voltage connections are indicated by a terminal symbol with a + sign. The value of the supply voltage may be selected to conform to the impedance values and the current requirements of the circuit design. A good workable value of supply voltage has been found to be about 300 volts. When employing neon lamps as the light source, it has been found desirable to employ a direct current power supply source, or an alternating current power supply at a frequency of about 1000 cycles. With other light sources, other voltages and frequencies may be employed. Conventional sources of power may be employed to obtain satisfactory operation of the systems of the present invention.

While the present invention has been described and illustrated with an embodiment employing lamps and photoconductors, it will be understood that other circuit technologies and devices may likewise be employed for embodying this invention. The lamp photoconductor devices are preferred, however. These combinations possess the advantage that the only coupling between the lamp and photoconductor is by means of the light emanating from the lamp to the photoconductor. There need be no common electrical connection between the two devices. The combination of the two devices may therefore be referred to as a four terminal device, signifying two terminals for the lamp and two terminals for the photoconductor. Other devices may be similarly characterized. For instance, a relay is a four terminal device. The complete electrical isolation between the lamp and the photoconductor is a tremendous advantage in promoting reliable operation without undesirable coupling.

While the invention has been particularly shown and described with reference to a preferred embodiment, it will be understood that various other changes in form and detail may be made without departing from the spirit and scope of the invention.

What is claimed is:

1. A ring circuit having a plurality of ring positions and comprising: a storage device for each ring position; a starting device for each ring position connected to energize the storage device in that ring position in response to an individual start signal; at least a first and second drive line for said ring circuit connected to all said ring positions, said first drive line being connected to selected ones of said ring positions and said second drive line being connected to the nonselected ones of said ring positions; a commutator device connected to energize said drive lines to provide a repeating sequence of drive signals to successive ring position storage devices at a rate of one pulse at a time whenever an advance of the ring is required, said starting device for each ring position having a switch element connected to set said commutator device to energize the drive line connected to that ring position; connections, including a plurality of switch elements, for connecting said drive lines to said ring position storage devices, there being at least one said connection joined to each of said storage devices, said latching elements including a switch element for latching on the storage device joined to said connection, and said switch elements also including a pick up switch element for each ring position having a succeeding ring position, said pick up switch element being connected between both the storage device in said succeeding ring position and the drive line connected to said succeeding ring position and operating said storage device in said succeeding ring position when said last-recited drive line is energized by a ring shift signal from said commutator device.

2. A ring circuit which has a plurality of ring positions, and which is capable of starting at any selected position of the ring, comprising: a position storage device for each ring position; a starting device for each ring position connected to energize the position storage device in that ring position in response to a start signal; at least a first and second drive line for said ring circuit, said drive lines including connections to provide a repeating sequence of drive signals to successive ones of said ring position storage devices, said first drive line being connected to selected ones of said ring positions and said second drive line being connected to the nonselected ones of said ring positions, said connections including for each ring position a latching switch element for latching on the storage device in that position in response to activation of the storage device in that position, and for each ring position having a succeeding ring position a pick up switch element operating said succeeding ring position storage device in joint response to activation of the storage device in that ring position preceding said succeeding ring position storage device, and, to the energization of said drive line connected to said succeeding ring position; a commutator device connected to energize said drive lines in repeating sequence at a rate of one pulse at a time whenever an advance of the ring is required; and a switch element in each said starting device for each ring position to set said commutating device to energize the drive line connected to that ring position.

3. A ring circuit which has a plurality of ring positions and is capable of starting at any selected position of the ring, comprising: a position storage device for each ring position; a starting device for each ring position connected to energize the position storage device in that ring position in response to a start signal; at least a first and second drive line for said ring circuit said first drive line being connected to selected ones of said ring positions and said second drive line being connected to the nonselected ones of said ring positions, said drive lines having connections to provide a repeating sequence of drive signals to successive ones of said ring position storage devices, said last mentioned connections including for each ring position a latching switch element and including for each ring position having a first succeeding ring position a pick up switch element connected between said each ring position and said first succeeding ring position to operate said first succeeding ring position storage device when the drive line connected to said first succeeding ring position is energized, a third switch element for each ring position having a second succeeding ring position, said third switch element being connected between that ring position and the pick up switch element of said first succeeding ring position to disable the pick up switch element of said first succeeding ring position storage device thereby preventing false operation of said pick up switch element of said first succeeding ring position as said first succeeding ring position storage device is energized, each ring position including at least one output switch element, said switching elements being arranged to complete said connections upon operation of the ring position storage device in that ring position; a commutator device connected to energize said drive lines in repeating sequence at a rate of one pulse at a time whenever an advance of the ring is required; and a switch element responsive to said starting device for each ring position to set said commutating device to energize the drive line connected to that ring position.

4. A photoconductor logic ring having a plurality of ring positions comprising: a latchable lamp photoconductor storage device for each ring position; a first photoconductor starting circuit for each ring position connected to energize the storage device in that ring position in response to an individual optical start signal; at least a first and second drive line for said ring, said first drive line being connected to selected ones of said ring positions and said second drive line being connected to the nonselected ones of said ring positions; a commutator device connected to energize said drive lines to provide a repeating sequence of drive signals to successive ring position storage devices at a rate of one pulse whenever an advance of the ring is required; each ring position including a second photoconductor circuit operating in response to said optical start signal to set said commutating device to energize the drive line connected to that ring position; connections from said drive lines to said ring position storage device lamps, said connections including photoconductors responsive to illumination from said storage device lamps in each said ring position to complete said connections upon operation of the storage device lamp in that ring position, said photoconductors including a latching photoconductor for connecting the storage device lamp in that ring position to one of said drive lines, said photoconductors also including a pick up photoconductor for each ring position having a succeeding ring position storage device, said pick up photoconductor being connected to the lamp in said succeeding ring position storage device for energization of said last-recited lamp when the drive line connected to said succeeding ring position is energized in response to a ring shift signal.

5. A photoconductor logic ring having a plurality of ring positions and comprising: a latchable lamp photoconductor storage device for each ring position; a first photoconductor starting circuit for each ring position connected to energize the storage device in that ring position in response to an individual optical start signal for that ring position, a first and second drive line for said ring, said first drive line being connected to selected ones of said ring positions and said second drive line being connected of the nonselected ones of said ring positions; a flip flop commutator device connected to energize said drive lines alternately and thereby provide a repeating sequence of drive signals to successive ring position storage devices at a rate of one pulse whenever an advance of the ring is required, each ring position including a second photoconductor circuit operating in response to said optical start signal to set said flip flop device to energize the drive line connected to that ring position; photoconductor connections from said drive lines to said ring position storage device lamps including a latching photoconductor for each storage device lamp arranged for illumination by that lamp and including a pickup photoconductor arranged for illumination by the lamp for each ring position having a succeeding ring position storage device, said pick up photoconductor being connected to said succeeding ring position storage device lamp for energization of said last-recited lamp when the drive line connected to said succeeding ring position is energized in response to a ring shift signal.

6. A photoconductor logic ring having a plurality of ring positions, and comprising: a latchable lamp photoconductor storage device for each ring position; a first photoconductor starting circuit for each ring position connected to energize the storage device in that ring position in response to an individual optical start signal; at least a first and second drive line for said ring, said first drive line being connected to selected ones of said ring positions and second drive line being connected to the nonselected ones of said ring positions; a commutator device connected to energize said drive lines to provide a repeating sequence of drive signals to successive ring position storage devices at a rate of one pulse whenever an advance of the ring is required; each ring position including a second pohotoconductor circuit operable in response to said optical start signal to set said communicating device to energize the drive line connected to that ring position; connections from said drive lines to said ring position storage device lamps, said connections including photoconductors responsive to illumination from each of said storage device lamps to complete said connections upon operation of the storage device lamp in that ring position, said photoconductors including a latching photoconductor for connecting the storage device lamp in that ring position to a drive line, said photoconductors also including a pick up photoconductor for each ring position having a succeeding ring position storage device, said pick up photoconductor being connected to said succeeding ring position storage device lamp for energization of said succeeding ring position storage device lamp when the drive line connected to said succeeding ring position storage device lamp is energized in response to a ring shift signal, and an inhibit photoconductor responsive to illumination by the storage device lamp for each ring position having a second succeeding ring position and connected to shunt out the lamp for said second succeeding ring position.

7. A photoconductor logic ring having a plurality of ring positions and comprising: a latchable lamp photoconductor storage device for each ring position; a first photoconductor starting circuit for each ring position connected to energize the storage device in that ring position in response to an individual optical start signal for that ring position; a first and second drive line for said ring, said first drive line being connected to selected ones of said ring positions and said second drive line being connected to the nonselected ones of said ring positions; a flip flop commutator device connected to energize said drive lines alternately to provide a repeating sequence of drive signals to successive ring position storage devices at a rate of one pulse whenever an advance of the ring is required; each ring position including a second photoconductor circuit operable in response to said optical start siganl to set said flip flop device to energize the drive line connected to that ring position; photoconductor connections from said drive lines to said ring position storage device lamps, including a latching photoconductor for each storage device lamp responsive to illumination by that lamp and including a pick up photoconductor responsive to illumination by the lamp for each ring position having a succeeding ring position storage device, said pick up photoconductor being connected to said succeeding ring position storage device lamp for energization of said succeeding ring position storage device lamp when the drive line connected to said succeeding ring position storage device lamp is energized in response to a ring shift signal, and an inhibit photoconductor responsive to illumination by the storage device lamp for each ring position having a second succeeding ring position and connected to shunt out the lamp for said second succeeding ring position.

References Cited by the Examiner

UNITED STATES PATENTS

| | | | |
|---|---|---|---|
| 2,727,683 | 12/1955 | Allen et al. | 250—209 X |
| 2,949,538 | 8/1960 | Tomlinson | 250—213 |
| 2,985,763 | 5/1961 | Ress | 250—208 |
| 2,996,622 | 8/1961 | Acton | 250—213 X |
| 2,997,596 | 8/1961 | Vize | 250—209 |
| 3,020,410 | 2/1962 | Bowerman | 250—213 X |

RALPH G. NILSON, *Primary Examiner.*

WALTER STOLWEIN, *Examiner.*